United States Patent [19]

Schleich et al.

[11] 4,045,355
[45] Aug. 30, 1977

[54] CLARIFICATION PLANT

[75] Inventors: Josef Schleich, Pfarrkirchen; Hans Zwisler, Unterpfaffenhofen, both of Germany

[73] Assignee: Heilmann & Littmann Bau-Aktiengesellschaft, Munich, Germany

[21] Appl. No.: 693,109

[22] Filed: June 4, 1976

[30] Foreign Application Priority Data

| June 11, 1975 | Germany | 2525909 |
| Oct. 10, 1975 | Germany | 2545406 |
| Nov. 4, 1975 | Germany | 2549270 |
| Dec. 5, 1975 | Germany | 2554768 |

[51] Int. Cl.² .......................................... B01D 21/02
[52] U.S. Cl. .......................................... 210/532 R
[58] Field of Search ............... 210/513, 519, 532 R, 210/532 S, 533, 170

[56] References Cited

U.S. PATENT DOCUMENTS

| 1,601,755 | 10/1926 | Hooker | 210/513 X |
| 2,285,893 | 6/1942 | Boosey | 210/519 |
| 2,430,519 | 11/1947 | Mallory | 210/513 X |
| 3,799,217 | 3/1974 | Bauer | 210/513 X |

*Primary Examiner*—William A. Cuchlinski, Jr.
*Attorney, Agent, or Firm*—Hans Berman

[57] ABSTRACT

An earth basin of a waste water clarification plant is divided by two concentric, cylindrical partitions into a central, circular, settling area to which the waste water is fed from an inlet, a circularly annular activating area surrounding the settling area and connected therewith by an overflow, and a final clarification area surrounding the outer partition and extending therefrom to the oval embankment of the basin which extends in a concentric semi-circle 180° about the common axis of the partitions, but is elongated radially over the remainder of the basin circumference.

15 Claims, 7 Drawing Figures

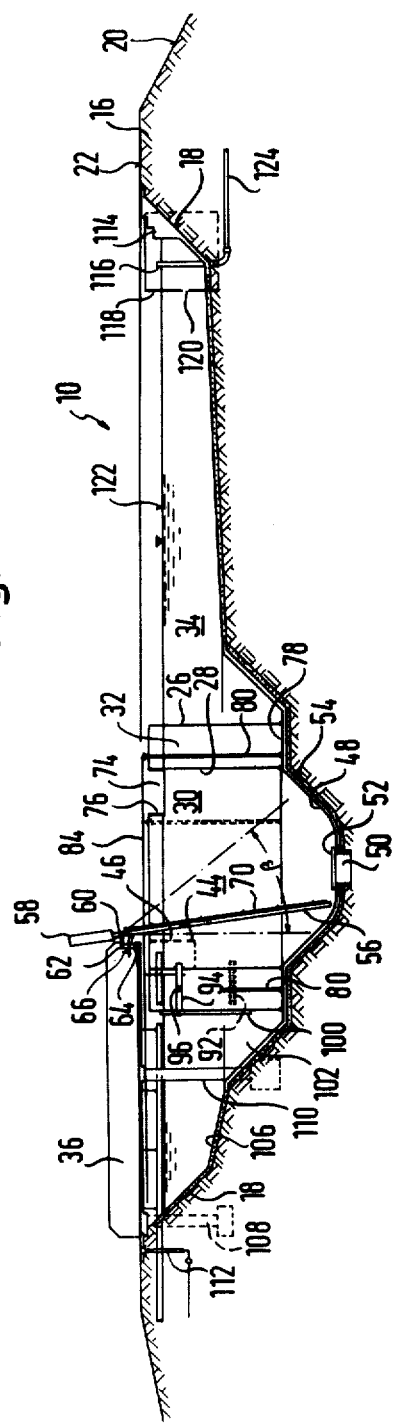

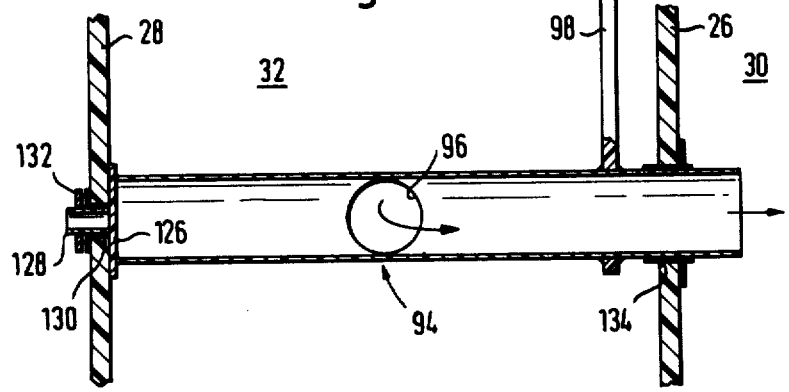
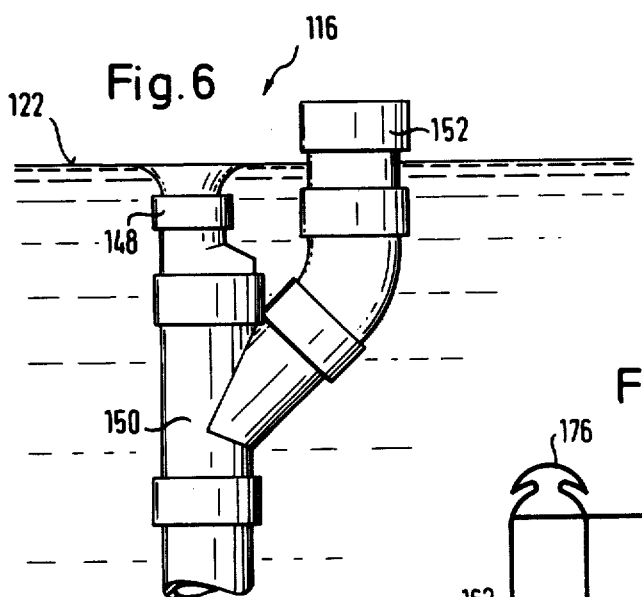
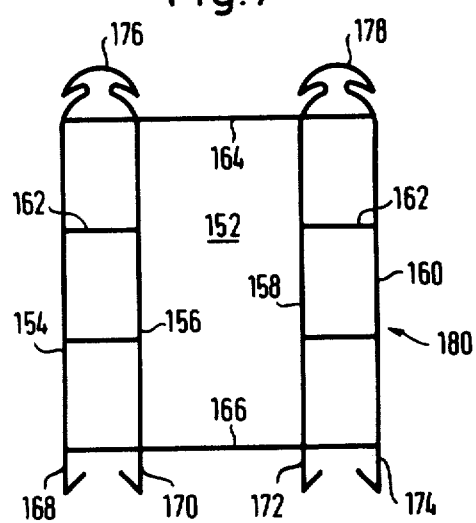

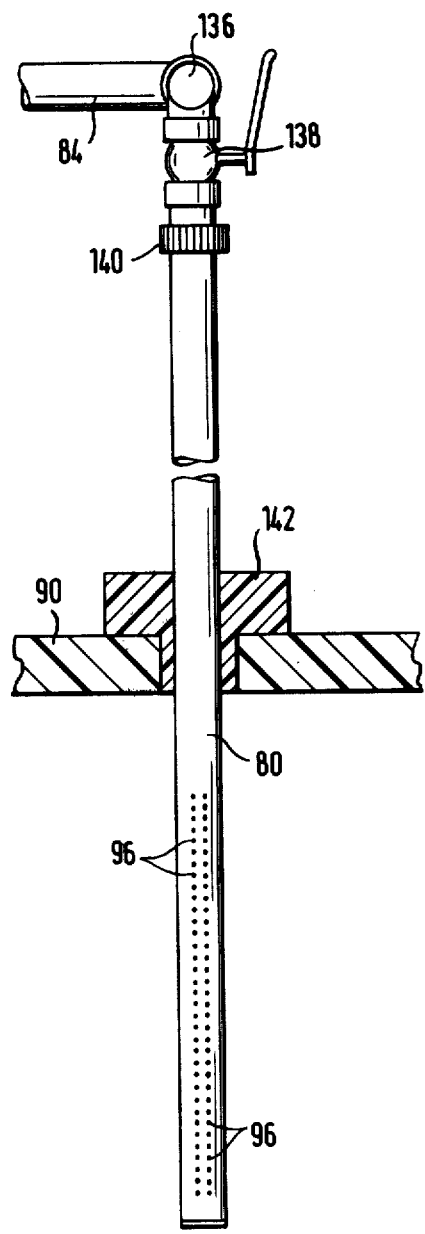
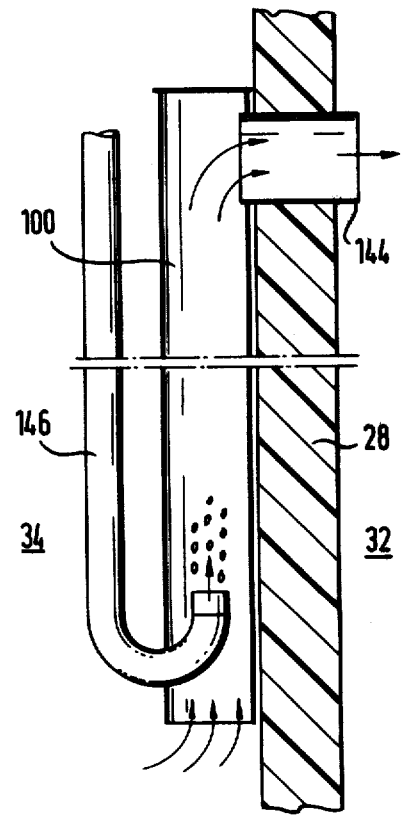
Fig. 4
Fig. 5

CLARIFICATION PLANT

The invention relates to a clarification plant having a lined earth basin subdivided by concentrically arranged, axially symmetrical partitions and including an inlet for waste water and an outlet for clarified waste water. Such a clarification plant is known, for example, from the published German application No. 2,401,872 and the German Pat. No. 505,154. Regardless of numerous construction types, conventional clarification plants have various disadvantages. They are costly in their construction, have high energy requirements, and are generally complex in their operation. Therefore, the invention generally aims at providing a clarification plant simplified and more effective as compared with known clarification plants.

This task is accomplished according to the invention by a clarification plant of the type initially described in which the earth basin has an oval contour and surrounds the concentric partitions on one side substantially in a concentrically semi-circle, but is elongated in an acutely tapering, arched curve on the other side including the outlet.

Numerous advantages result from the oval basic shape of the earth basin. The water surface in the outer range is enlarged by the oval elongation so that the absorption of oxygen during final clarification is enhanced. From the point of view of construction technology, the oval shape has the advantage that the excavation is traveled on by construction vehicles without difficulty on the side of the acutely tapering, gently sloping extension. Moreover, the elongated shape of the earth basin permits good adaptation to the landscape and good utilization of elongated plots.

Preferably, a settling area partitioned off by a circular partition, into which area the inlet merges and which has a funnel-shaped bottom, is provided in the center of the concentric range, and the settling area is surrounded by an activating area separated by a further circular partition and having a substantially flat bottom, the activating area receiving the waste water from the settling area and delivering it to a surrounding final clarification area which occupies the remainder of the earth basin.

According to a preferred embodiment, the bottom of the earth basin rises in a circle surrounding the partitions first in a funnel shape and then merges into a gently rising part which terminates in an oval embankment.

The partitions advantageously consist of assembled, upright plastic bars which are capable of being easily installed, interchanged, and displaced.

Preferably upright, perforated air pipes open into the activating area and have openings arranged in such a manner that they release air in the same circumferential direction so that the waste water circulates in the activating area. An overflow is provided between the settling area and the activating area, and the activating area is connected with the final clarification area by slots in the lower region. Because a layer of sludge may form particularly in the upper portion of the activating area, there is provided a return pipe which returns the sludge to the settling area. Additionally, waste water is returned to the activating area from the bottom of the final clarification area where it contains dead and live bacteria to a particularly great extent so that the biological decomposition is enhanced.

The sludge is pumped out from the bottom of the settling area.

A catwalk extends over the center of the concentric portion of the earth basin beyond the edge of the settling area. Further details of the invention are evident from the following description of a specific embodiment. In the drawing:

FIG. 2 is a longitudinal section of the clarification plant of FIG. 1;

FIG. 3 shows a portion of the apparatus of FIG. 2 on a larger scale;

FIG. 4 is an enlarged view of another portion of the apparatus of FIG. 2;

FIG. 5 shows a further portion of the apparatus of FIG. 2 on a larger scale;

FIG. 6 shows an additional feature of the apparatus of FIG. 2 in an enlarged view; and FIG. 7 is an enlarged plan cross section of a plastic bar which is a structural element of the clarification plant.

Figure 1:
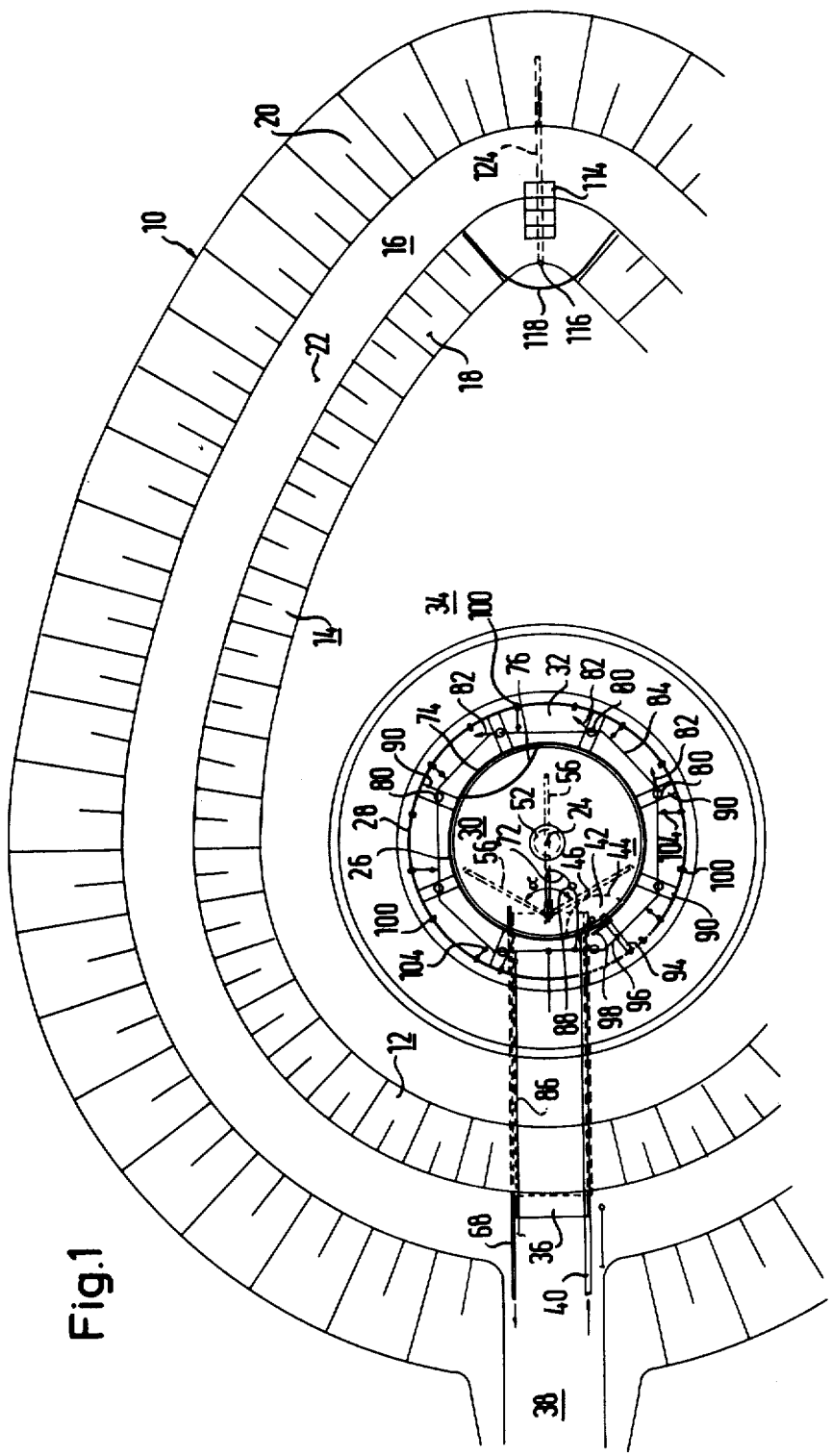
FIG. 1 shows the entire clarification plant in fragmentary top plan view.

Reference is had first to FIGS. 1 and 2 which show the clarification plant according to the invention in its entirety. The earth basin 10, according to FIG. 1, has a semi-circular side 12 (at the left of FIG. 1) and another side 14 (at the right in FIG. 1) which has the shape of a rounded ogive so that the overall plan of the earth basin has an approximately oval shape. The earth basin is bounded by an earth dam 16 having an inner embankment 18, an outer embankment 20, and a flat top which serves as a pathway 22 for service personnel.

Circular partitions 26, 28 are arranged concentrically about the center 24 of the semi-circular side 12. The inner partition 26 bounds a settling area 30 on its inner side, and an activating area 32 jointly with the outer partition 28. The entire space outside the outer partition 28 serves as a final clarification area 34.

The partitions 26, 28 are assembled from upright plastic bars which will be referred to later more precisely.

A bridge 36 of U-shaped cross section extends an access path 38 beyond the inner partition 26. The bridge 36 can be walked by the control personnel so that the several areas of the clarification plant may be inspected from above.

The clarification plant is fed contaminated water by an inlet pipe 40 which terminates in a marginal portion 42 of the settling basin 30 which is shielded by a circularly arcuate, immersed apron 44. The apron may have openings 46 or be imperforate. In the latter case, the contaminated water is discharged downwardly into the settling basin 30.

As shown in FIG. 2, the bottom 48 of the settling basin 30 is funnel-shaped so that the settling mud collects in the central portion of the bottom. The center of the bottom 46 is provided with an aperture 50 which is closed by an upwardly releasable cover 52. The cover 52 serves as a safety valve for the event of a very high groundwater level so that excessive upward pressure of the groundwater and a resulting destruction of the earth basin are prevented because the ground water can enter the earth basin in this event.

The bottom 48 has a reinforcing layer 54 of concrete, bitumen or the like which extends over the entire earth basin 10. A suction pipe 56 of a sludge pump 58 dips into the settling area 30. The suction pipe 56 starts from the bottom of the settling area 30 and is capable of being pivoted on a support 64 about shafts 60, 62. The inclination of the suction pipe 56 may be set by an adjusting spindle 66 of the support 64. The support 64 is fastened to the bridge 36 and is connected, in a manner not shown in detail, with a sludge pipe 68 leading to a non-illustrated sludge settling basin. A rinsing lance 70 is fastened to the suction pipe 56 by suitable fastening means (not shown), may be connected by means of a rubber hose 72 with a compressed air system described below, and serves for releasing mud firmly settled on the bottom of the settling basin for removal by suction. The tilting range of the suction pipe 56 in a horizontal direction is indicated in FIG. 1 by α, and the tilting range in a vertical direction is indicated in FIG. 2 by β.

An overflow 74 connects the settling area 30 with the activating area 32 for guiding flow into the activating area. An arcuate, immersed apron 76 is located at the side of the settling area and retains floating mud particles.

The activating basin 32 has a horizontal bottom 78. Upright air pipes 80 are circumferentially distributed in the activating basin and are provided with apertures on one side (not shown in FIGS. 1 and 2) arranged in such a manner that the air leaves in only one of the circumferential directions according to arrows 82 in FIG. 1. The waste water in the activating area 32 is thereby put in a circulatory motion. The air pipes 80 are connected to an annular air line 84 which in turn communicates with a compressed-air line 86 through which compressed air is supplied from a compressed air source, not shown. The aforementioned rubber hose 72 is connected to the air line 84 through a control valve 88. The air pipes 80 are closed at the bottom 78 and fastened there, and are otherwise held by fastening plates 90 which extend between the partitions 26, 28. Details of this matter are to be described later. The atmospheric oxygen introduced into the activating area 32 by the air pipes 80 serves for activating bacterial life and thus for enhancing the biological clarification.

Whereas the overflow 74 is located between the settling basin 30 and the activating basin 32 approximately opposite the orifice of the inlet pipe 40, the outlet of the activating area toward the outwardly successive final clarification area 34 is in turn provided opposite the overflow 74 and particularly opposite the outlet of the earth basin which is to be described later. The outlet 92 consists of a plurality of guide slots located approximately in the lower third of the partition 28.

Whereas the waste water flows during the clarification process predominantly from the settling area 30 into the activating area 32 and thence into the final clarification area 34, a predetermined portion of the waste water is fed back between these areas.

A relatively dense sludge accumulates in the upper region of the activating area 32 due to the entry of air. This sludge is partly or entirely fed back by a pipe 94 which extends between the partitions 26, 28 and passes through the partition 26. The pipe 94 is closed at the radially outer end and open at the inner end. It is located in the upper portion of the activating area 32 near the outlet 92 and has an opening 96 extending over a portion of its circumferential area. The pipe 94 is capable of being turned about its longitudinal axis by means of an adjusting arm 98. The largest amount of sludge is received by the pipe 94 when the pipe is in the position of FIG. 1 in which the opening 96 faces directly into the current circulating in the activating area. The fed-back sludge partly settles again in the settling area 30, and the remaining waste water again enters the activating area 32 by way of the overflow 74.

Another feedback system is located at the outer side of the outer partition 28. Pipes 100 rise from the funnel-shaped bottom area 102 which surrounds the outer partition 28 in an annular shape. The pipes 100 extend vertically upward and open out into the activating area 32 through the partition 28. Details are to be set forth later in more detail. Air jet pumps are used for pumping the waste water, the pumps being connected with the air line 84 by valves 104. As is shown in FIG. 1, pipes 100 may be provided on the circumference of the partition 28 in several positions. Several pipes indicated in FIG. 1 are provided as spares only and are not connected with the air line 84, but may be activated at any time. The waste water rich in dead and living bacteria at the bottom of the final clarification area 34 is returned to the activating area by the pipes 100 which are preferably located within range of the outlet 92 of the activating area 32, so that the biological conversion by bacteria is enhanced.

Adjacent the funnel-shaped bottom area 102, the final clarification area 34 has a bottom 106 gently rising in an outward direction and terminating in the embankment 18. Thereby, a large shallow water reservoir favoring strong oxygen transfer to the water from the ambient air and thereby furthering additional final clarification is formed particularly on the side of the oval extension, that is, to the right in FIGS. 1 and 2.

To the left of FIG. 2, there are shown two columns 108, 110 carrying the bridge 36. Furthermore, there is provided a hydrant 112 which serves for supplying fresh water. On the embankment 18 on the right of FIGS. 1 and 2, there is a stair 114 for service purposes. An outlet 116 is arranged in front of the stair and will be dealt with below in more detail. The outlet 116 too is shielded by an immersed apron 118 which has apertures 120 below the water level 122. The immersed apron 118 particularly retains foam which occasionally forms in the final clarification basin 34. The outlet 116 which is to be discussed in more detail later opens into an outlet pipe 124 for discharge of the clarified water.

FIG. 3 shows the pipe 94 for transferring sludge from the activating area 32 into the settling area 30 in more precise detail. The pipe 94 is closed on its radially outer end by a plate 126. A tubular pin 128 is coaxially fastened on the plate 126, passes a lined bore 130 in the outer partition 28, and is held fast on the outer side of the partition 28 by a retaining ring 132 or the like. The pipe 94 passes through the partition 26 in a bore 134 which is also lined. In this manner, the pipe 94 is rotatable about its longitudinal axis so that the position of the opening 96 and thus the amount of the entering sludge may be adjusted. The adjusting arm 98 facilitates rotating the pipe 94. The elements illustrated in FIG. 3 consist preferably of plastic, particularly PVC, as do the partitions 26, 28.

FIG. 4 shows details of the air pipes 80. The air pipes 80 are connected with the airline 84 by a T-fitting 136 or the like. A valve 138 is located below the T-fitting for dosing the supplied amount of air. A threaded connector 140 is arranged below the valve 138 and permits disassembly and alignment of the air pipe 80. The air pipe 80 is guided by a bushing 142 which is set in the fastening plate 90. As mentioned already, the openings 81 for discharge of air are located on only one side of the air pipe 80, for example, in two parallel, closely juxtaposed rows, as is shown in FIG. 4. By way of example, 90 bores having a diameter of one millimeter may be provided.

FIG. 5 illustrates the sludge feedback between the final clarification area and the activating area. A downwardly open and upwardly closed pipe 100 is fastened to the outer face of the partition 28 and is connected at its upper end with a laterally branching pipe nipple 144 which passes through the partition 28 and opens into the activating area 32. A descending air pipe 146 having a lower end bent back upwardly in a U-shape laterally enters the lower portion of the pipe 100 and is connected with the air line 84 by valves 104 as mentioned above. The air released from the air pipe 146 operates in the known manner of an air-lift pump based on the fact that water mixed with air has a reduced specific gravity and rises, thereby creating a pumping effect.

FIG. 6 shows the outlet 116. The outlet has two stages for adaptation to different water levels. At the normal water level 122, the water runs into a pipe 148 of relatively narrow cross section which merges directly with a pipe 150 of wider cross section. The pipes 148, 150 stand essentially upright and have a common axis or two parallel axes.

An additional pipe 152 having an upper rim higher than that of the pipe 148 and a diameter approximating that of the pipe 150 is located laterally adjacent the pipe 148 and arcuately merges with the pipe 150 below the pipe 148. Under normal conditions, when only the pipe 148 accepts the outflowing water, subatmospheric pressure is generated by the enlargement of the flow path in the pipe 150 so that air is drawn in through the pipe 152 and is mixed with the water. A supplemental clarification effect results therefrom.

FIG. 7 shows a plastic bar 180 for construction of the partitions 26, 28, the immersed aprons, and corresponding elements in transverse section. The plastic bar is an extruded, hollow shape consisting of PVC, for example, having a substantially rectangular overall cross section. A cavity 153 is located in the interior of the rectangle. The two long sides of the rectangle which provide the outer faces of the partitions in the operative condition have each two parallel walls 154, 156 and 158, 160 respectively bounding chambers which are subdivided into individual compartments by transverse webs 162. The two frontal sides of the shape are closed by single-layer walls 164, 166.

In longitudinal alignment with the walls 154, 156, 158, 160, flanges 168, 170, 172, 174 project from the frontal wall 166, and constitute two pairs of flanges, each having a portion spaced from the wall 166 and acutely angularly offset toward the other flange of the pair in a hook shape. In extension of the walls 154, 156, 158, 160, mushroom-shaped projections 176, 178 project from the other frontal wall 164 and are each capable of being pressed between the flanges 168, 170, 172, 174 of an adjacent plastic bar and to be held fast by the offset hook portions of the flanges 168, 170, 172, 174.

We claim:
1. A clarification plant for aqueous waste comprising:
   a. an embankment and a bottom wall upwardly flaring toward said embankment,
      1. said embankment being of oval contour in plan view;
      2. said bottom wall and said embankment bounding a basin open in an upward direction;
   b. a plurality of upright partitions in said basin,
      1. said partitions being annular about an upright axis and spaced from each other radially relative to said axis to define in said basin an innermost settling area, an activating area surrounding said settling area, and a clarifying area surrounding said activating area,
      2. a portion of said embankment extending in an arc spacedly adjacent the radially outermost of said partitions,
      3. the remainder of said embankment extending away from said outermost partition farther than said portion thereof and bounding a radially elongated portion of said clarification area,
      4. a portion of said bottom wall downwardly bounding said clarifying area and sloping upwardly from said outermost partition toward said remainder of said embankment more gently than toward said portion of the embankment;
   c. inlet means for admitting waste to said settling area;
   d. outlet means for releasing clarified water from said portion of said clarifying area.

2. A plant as set forth in claim 1, further comprising guide means for guiding sequential flow of liquid from said settling area to said activating area and thence to said clarifying area, said bottom wall having a funnel-shaped portion downwardly bounding said settling area.

3. A plant as set forth in claim 2, wherein said portion of the bottom wall downwardly bounding said clarifying area has a funnel-shaped, annular part extending about said activating area and another part sloping from said annular part toward said remainder of said embankment and having a gentler slope than said funnel-shaped part.

4. A plant as set forth in claim 2, wherein said basin in said clarifying area has a funnel-shaped, annular bottom portion extending in a circle about said activating area, said basin including an embankment bounding said clarifying area in an outward direction and having another bottom portion sloping from said annular, funnel-shaped portion upward toward said embankment more gently than said funnel-shaped portion.

5. A plant as set forth in claim 2, further comprising an immersed apron separating a marginal area of said settling area from the remainder of said settling area, said inlet means including a conduit opening in said marginal area.

6. A plant as set forth in claim 2, wherein said guide means include overflow means connecting said settling area and said activating area, and an immersed apron is said settling area shielding said overflow means.

7. A plant as set forth in claim 2, wherein one of said partitions separates said activating area from said clarifying area, said one partition being formed with slots therein adjacent said bottom of said activating area, and spaced from said axis substantially opposite to said outlet means, said slots constituting a portion of said guide means.

8. A plant as set forth in claim 2, further comprising a plurality of perforated upright pipes circumferentially distributed about said axis in said activating area, supply means for supplying air under pressure to said pipes for discharge thereof from the perforations of said pipes, the perforations of said pipes being directed in a common circumferential direction, whereby a liquid in said activating area is put in circumferentially circulating motion by the discharged air.

9. A plant as set forth in claim 8, further comprising a sludge feed-back pipe having respective orifices in said activating area and in said settling area, and operating means for turning said feed-back pipe toward and away from a position in which the orifice thereof in said activating area faces said circumferentially circulating motion.

10. A plant as set forth in claim 2, further comprising a feed-back conduit having a first orifice in said activating area and a second orifice in said clarifying area lower than said first orifice, and pump means in said conduit for pumping fluid through said conduit from said clarifying area to said activating area.

11. A plant as set forth in claim 2, further comprising a sludge pump, a suction pipe mounted in said settling area for universal pivoting movement, said suction pipe having a free orifice in said settling area near said bottom wall and communicating with said sludge pump for removing sludge from said bottom wall.

12. A plant as set forth in claim 2, further comprising a lance attached to said suction pipe for movement therewith, and a source of air under pressure communicating with said lance for loosening sludge on said bottom wall by means of air discharged from said lance.

13. A plant as set forth in claim 2, wherein said outlet means include a first upright pipe having an orifice open toward said clarifying area and a second pipe having an orifice open toward said clarifying area on a level higher than the orifice of said first pipe, said first pipe flaring in a downward direction, whereby a portion of said first pipe remote from the orifice thereof has a flow section greater than the flow section of said orifice of the first pipe, said second pipe leading laterally into said portion of said first pipe.

14. A plant as set forth in claim 2, wherein said partitions each consist of vertically elongated, horizontally juxtaposed bars connected by respective interengaged projections.

15. A plant as set forth in claim 14, wherein each of said bars has a projection substantially mushroom-shaped in plan section and directed toward one of the immediately juxtaposed other bars, and two projections hook-shaped in said plan section and directed toward the other immediately juxtaposed other bar, the mushroom-shaped projection of each bar being retained between the hook-shaped projections of another bar for connecting said bars.

* * * * *